United States Patent [19]

Nitz

[11] Patent Number: 4,706,522

[45] Date of Patent: Nov. 17, 1987

[54] STEP-OUT CLUTCH-TO-CLUTCH UPSHIFT CONTROL

[75] Inventor: Larry T. Nitz, Troy, Mich.

[73] Assignee: General Motors Corporation, Detroit, Mich.

[21] Appl. No.: 825,356

[22] Filed: Feb. 3, 1986

[51] Int. Cl.$^4$ ............................................. B60K 41/08
[52] U.S. Cl. ...................................... 74/866; 74/877; 74/733; 364/424.1
[58] Field of Search ................. 74/733, 865, 866, 877; 364/424.1; 192/0.052, 0.096

[56] References Cited

U.S. PATENT DOCUMENTS

| | | | |
|---|---|---|---|
| 3,662,625 | 5/1972 | Wakamatsu et al. | 74/866 |
| 4,031,782 | 6/1977 | Miller et al. | 74/866 |
| 4,102,222 | 7/1978 | Miller et al. | 74/866 |
| 4,314,340 | 2/1982 | Miki et al. | 364/424.1 |
| 4,367,528 | 1/1983 | Kawamoto et al. | 364/424.1 |
| 4,502,354 | 3/1985 | Suzuki et al. | 74/866 |
| 4,517,859 | 5/1985 | Nagaoka et al. | 74/866 |

FOREIGN PATENT DOCUMENTS

30555 2/1983 Japan ............................... 364/424.1

*Primary Examiner*—Rodney H. Bonck
*Assistant Examiner*—Richard M. Lorence
*Attorney, Agent, or Firm*—Mark A. Navarre

[57] ABSTRACT

A control method for the torque establishing devices of a motor vehicle multiple speed ratio automatic transmission which is connected to the engine through a fluid coupling, particularly in step-out situations where an upshift is commanded in response to a rapid decrease in the engine throttle position. When step-out situations likely to produce a sharp reversal in the polarity of torque carried by the transmission input shaft are identified, an activated torque establishing device is deactivated at a time determined in relation to the speed ratio across the fluid coupling, thereby avoiding transmission gear lash related output torque disturbances due to the torque reversal.

12 Claims, 16 Drawing Figures

STEP-OUT CLUTCH-TO-CLUTCH UPSHIFT CONTROL

This invention relates to clutch-to-clutch speed ratio control in a motor vehicle automatic transmission, and more particularly to a system for controlling upshifts which are made in response to at least partial release of the engine throttle by the operator of the vehicle.

BACKGROUND OF THE INVENTION

Generally, a motor vehicle automatic transmission includes a number of gear elements coupling its input and output shafts, and a related number of torque establishing devices such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches".

The input shaft is connected to the vehicle engine through a fluid coupling such as a torque converter, and the output shaft is connected directly to the vehicle wheels. Shifting from one forward speed ratio to another is performed in response to engine throttle and vehicle speed, and generally involves releasing or disengaging the clutch or brake (off-going) associated with the current speed ratio and applying or engaging the clutch or brake (on-coming) associated with the desired speed ratio.

Shifts performed in the above manner, using clutches and/or reaction clutches, are termed clutch-to-clutch shifts and require precise timing in order to achieve high quality shifting, especially in situations where the transmission is upshifted in response to at least partial release of the engine throttle by the operator of the vehicle. Shifts of this type are termed step-out or lift-foot upshifts, and may be accompanied by a sharp torque reversal at the input shaft of the transmission.

Under such circumstances, the sharp torque reversal is carried through to the transmission output shaft prior to the shift via the active torque establishing device, and the the driveline experiences a significant torque disturbance due to lash in the transmission gear elements. A second disturbance is often experienced when the output torque is reversed to a positive sense by the application of the on-coming torque establishing device during the impending upshift.

For this and other reasons, automatic transmissions commonly include freewheeling or one-way torque transmitting elements in series with a reaction clutch, which elements are capable of transmitting torque in one direction only. As soon as the applied torque reverses, the driving element overruns the driven element and no torque is transmitted therethrough. When the on-coming torque establishing device is applied the output torque increases from near zero with little or no torque disturbance. However, one-way devices do not come without expense, and it is highly desirable to limit their usage in transmissions.

SUMMARY OF THE INVENTION

This invention is directed to a motor vehicle electronic transmission control system for achieving high quality clutch-to-clutch upshifts in response to part or full release of the engine throttle by the operator of the vehicle without the use of freewheeling or one-way torque transmitting elements. Essentially, objectionable torque reversals across the transmission gear elements are avoided by identifying engine operating conditions which characteristically result in a sharp torque reversal and introducing a neutral interval before the torque reversal is transmitted through the transmission. When the on-coming torque establishing device is applied to effect the upshift, the output torque increases from near zero so that lash related torque disturbance during the shift is substantially eliminated. If an upshift is not possible for some reason, the no-neutral interval is effected.

The engine throttle position and the rate of change of engine throttle position are monitored to identify impending torque reversals, the severity of which is judged by comparing the monitored parameters to empirically determined reference values. In situations where the impending torque reversal, if any, is expected to be relatively minor, the active torque establishing device is maintained in an active state, but the parameters for the impending upshift are modified to avoid a sharp torque reversal to the positive sense when the on-coming establishing device is applied.

In more severe situations, the active (off-going) torque establishing device is released concurrent with or just prior to the actual occurrence of the initial torque reversal. In such cases, the speed ratio across the torque converter is detected as a measure of the torque transmitted therethrough to schedule the release. If the release does not occur within a predetermined time, or if the operator reapplies the throttle before the release occurs, the release is canceled. If the transmission includes a torque converter clutch, and such clutch is applied, the speed ratio thereacross is unity and the active clutching device is released as soon as operating conditions indicative of a severe torque reversal are detected.

As in the less severe situations, the parameters for the impending upshift are modified to avoid a sharp torque reversal to the positive sense when the on-coming torque establishing device is applied.

IN THE DRAWINGS

FIGS. 2A–E and 3A–E graphically depict the operation of this invention in response, to step-out conditions of different severity.

Figure 1A:
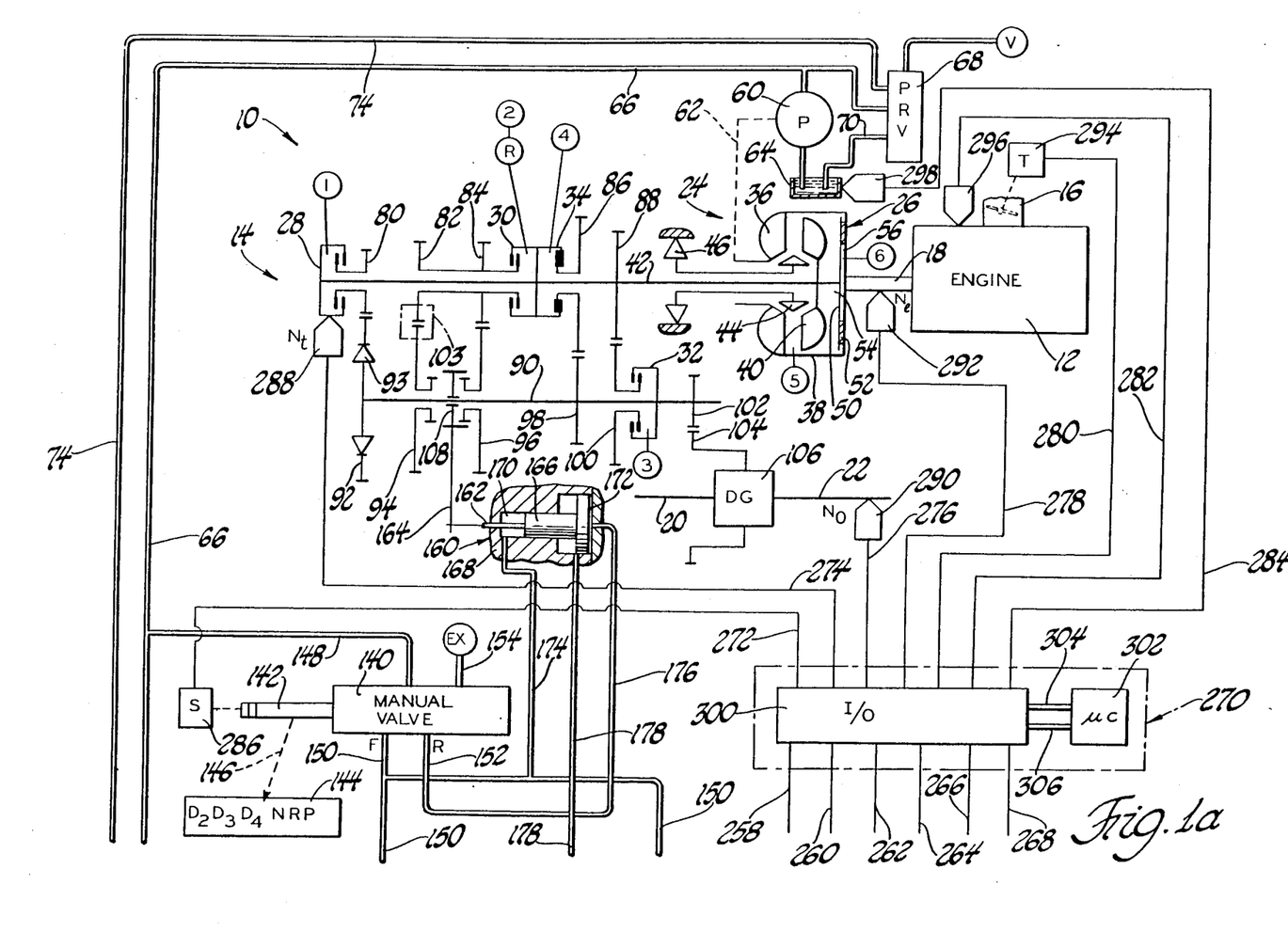
FIGS. 1a and 1b depict a computer based electronic transmission control system for carrying out the teachings this invention.
Figure 1B:
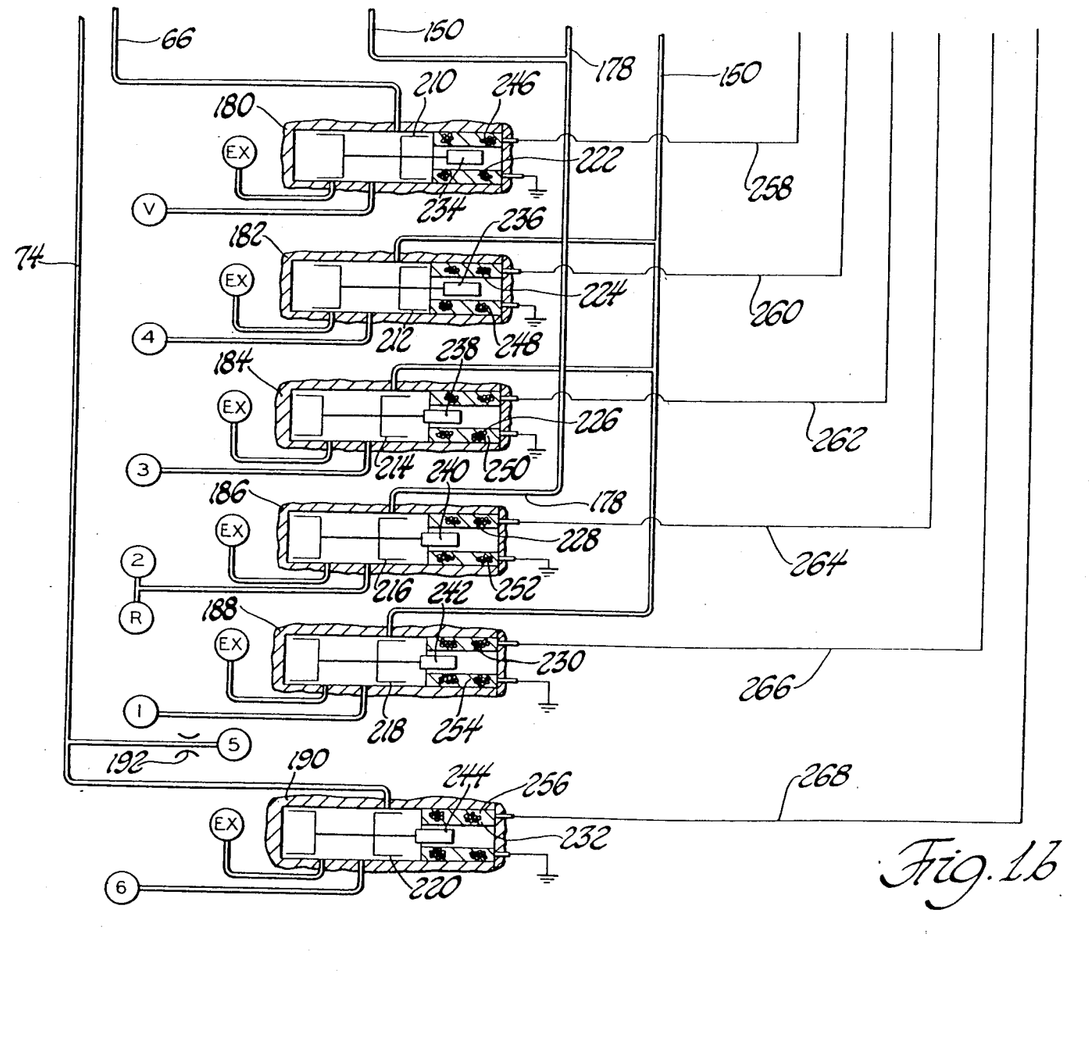

Referring now to the drawings, and more particularly to FIGS. 1a and 1b, the reference numeral 10 generally designates a motor vehicle drive train including an engine 12 and a parallel shaft transmission 14 having a reverse speed ratio and four forward speed ratios. Engine 12 includes a throttle mechanism 16 mechanically connected to an operator manipulated device such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26–34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1, thereby engaging the clutching device 26 to provide a mechanical drive connection in parallel with the torque converter 24. In such case, there is no slippage between the impeller 36 and the turbine 40.

When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36 as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70.

In addition, pressure regulator valve 68 supplies fluid pressure for the torque converter 24 via line 74. While the pump and pressure regulator valve designs are not critical to the present invention, a representative pump is disclosed in U.S. Pat. No. 4,342,545 to Schuster issued Aug. 3, 1982, and a representative pressure regulator valve is disclosed in U.S. Pat. No. 4,283,970 to Vukovich issued Aug. 18, 1981, such patents being assigned to the assignee of the present invention.

The transmission shaft 42 and a further transmission shaft 90 each have a plurality of gear elements rotatably supported thereon. The gear elements 80–88 are supported on shaft 42 and the gear elements 92–102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28–34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86.

Each of the clutching devices 28–34 is biased toward a disengaged state by a return spring (not shown). Engagement of the clutching device is effected by supplying fluid pressure to an apply chamber thereof. The resulting torque capacity of the clutching device is a function of the applied pressure less the return spring pressure, hereinafter referred to as the working pressure $\Delta P$.

The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80–88 and 92–100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28–34 in a released condition.

The speed ratios defined by the various gear element pairs are generally characterized by the ratio of the turbine speed $N_t$ to output speed $N_o$. Representative $N_t/N_o$ ratios for transmission 14 are as follows:

First—2.368
Second—1.273
Third—0.808
Fourth—0.585
Reverse—1.880

As indicated above, shifting from a current forward speed ratio to a desired forward speed ratio requires that the clutching device associated with the current speed ratio (off-going) be disengaged and the clutching device associated with the desired speed ratio (on-coming) be engaged. For example, a shift from the first forward speed ratio to the second forward speed ratio involves disengagement of the clutching device 28 and engagement of the clutching device 30.

The fluid control elements of the transmission 14 include a manual valve 140, a directional servo 160 and a plurality of electrically operated fluid valves 180-190. The manual valve 140 operates in response to operator demand and serves, in conjunction with directional servo 160, to direct regulated line pressure to the appropriate fluid valves 182-188. The fluid valves 182-188, in turn, are individually controlled to direct fluid pressure to the clutching devices 28-34. The fluid valve 180 is controlled to direct fluid pressure from the pump output line 66 to the pressure regulator valve 68, and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148 and the valve outputs include a forward (F) output line 150 for supplying fluid pressure for engaging forward speed ratios and a reverse (R) output line 152 for supplying fluid pressure for engaging the reverse speed ratio.

Thus, when the shaft 142 of manual valve 140 is moved to the D4, D3, or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172.

The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio.

When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60, and are individually controlled to direct fluid pressure to the pressure regulator valve 68 or respective clutching devices 26-34. The fluid valve 180 receives line pressure directly from pump output line 66, and is controlled to direct a variable amount of such pressure to the pressure regulator valve 68 as indicated by the circled letter V. The fluid valves 182, 184 and 188 receive fluid pressure from the forward output line 150 of manual valve 140, and are controlled to direct variable amounts of such pressure to the clutching devices 34, 32 and 28 as indicated by the circled numerals 4, 3 and 1, respectively. The fluid valve 186 receives fluid pressure from the forward output line 150 and the directional servo output line 178, and is controlled to direct a variable amount of such pressure to the clutching device 30 as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26 as indicated by the circled numeral 6. The apply chamber 54 of the clutching device 26 is supplied with fluid pressure from the output line 74 via the orifice 192 as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1, the input and output passages are connected. Each of the fluid valves 180-190 includes an exhaust passage as indicated by the circled letters EX, such passage serving to drain fluid from the respective clutching device when the spool element is shifted to the leftmost position as viewed in FIG. 1.

In FIG. 1, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 surrounding the respective plunger.

One terminal of each such solenoid coil 246-256 is connected to ground potential as shown, and the other terminal is connected to an output line 258–268 of a control unit 270 which governs the solenoid coil energization. As set forth hereinafter, the control unit 270 pulse width modulates the solenoid coils 246–256 according to a predetermined control algorithm to regulate the fluid pressure supplied to the pressure regulator 68 and the clutching devices 26–34, the duty cycle of such modulation being determined in relation to the desired magnitude of the supplied pressures.

While the fluid valves 180–190 have been illustrated as spool valves, other types of valves could be substituted therefor. By way of example, valves of the ball and seat type could be used. In general terms, the fluid valves 180–190 may be mechanized with any three-port pulse-width-modulated valving arrangement.

Input signals for the control unit 270 are provided on the input lines 272–284. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276, and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272–284 according to a predetermined control algorithm as set forth herein, for controlling the energization of the fluid valve solenoid coils 246–256 via output lines 258–268. As such, the control unit 270 includes an input/output (I/O) device 300 for receiving the input signals and outputting the various pulse-width-modulation signals, and a microcomputer 302 which communicates with the I/O device 300 via an address-and-control bus 304 and a bidirectional data bus 306. Flow diagrams representing suitable program instructions for developing the pulse width modulation outputs in accordance with the teachings of this invention are depicted in FIGS. 4–7.

Figure 2:
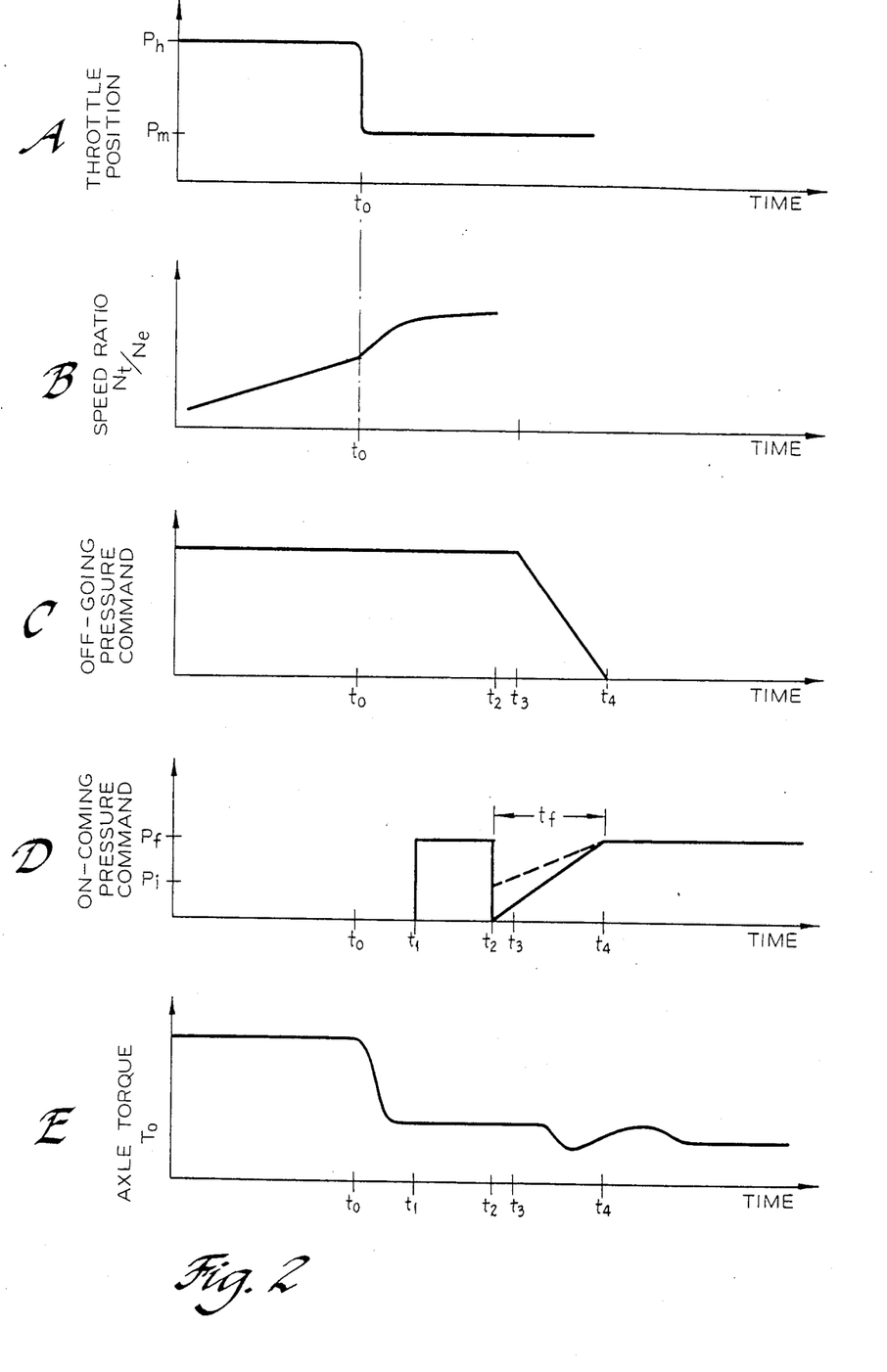
FIGS. 2A–E depict an upshift made in response to a relatively minor step-out condition.

Graphs A–E of FIG. 2 share a common time base and depict a 2–3 upshift made in response to a step-out condition where the accompanying torque reversal, if any, is expected to be relatively minor. Graph A depicts the engine throttle position; Graph B depicts the speed ratio $N_t/N_e$ across the torque converter 24; Graph C depicts the pressure command P(OFG) for the off-going (active) clutching device 30; Graph D depicts the pressure command P(ONC) for the on-coming clutching device 32; and Graph E depicts the output or axle torque $T_o$.

At time $t_O$, the engine throttle is partially released from the relatively high torque position $P_h$ to a moderate torque position $P_m$, and the engine speed $N_e$ drops somewhat. Accordingly, the ratio $N_t/N_e$ increases at a faster rate as seen in Graph B. Based on the absolute throttle position and its rate of change, however, the control unit 270 detects a step-out condition, but determines that it is relatively minor. That is, an initial torque reversal may occur due to the step-out, but it will be relatively minor (not sharp), and no significant driveline torque disruption is expected to result therefrom. In the situation depicted in FIG. 2, no torque reversal occurs. In all such cases, the active clutching device 30 is maintained in the applied condition until the upshift occurs.

At time $t_1$, a 2–3 upshift is commanded, and the fill phase of the shift takes place between times $t_1$ and $t_2$. Under normal, non-step-out conditions, the duration of the fill phase is calibrated relative to the fluid supply pressure so that its termination coincides with the point at which the on-coming clutching device is prepared to transmit torque. However, since the illustrated upshift is being made in to a throttle release, the fill time $t_{fill}$ is shortened to soften the application of the on-coming clutching device 32.

In addition, the apply and release rates for the on-coming and off-going torque establishing devices 32 and 30 following the fill phase are lower than the schedules used in a non-step-out upshift. In a non-step-out upshift, the pressure command for the on-coming clutching device at the end of the fill phase steps immediately to a predetermined initial value $P_i$, and then progressively increases over a predetermined time interval $t_f$ to a final value $P_f$ as indicated by the broken trace in Graph D of FIG. 2, the predetermined values being determined as a function of an input torque related variable. Details relating to the development of the non-step-out pressure commands is set forth in a copending patent application U.S. Ser. No. 802,677, filed Nov. 29, 1985, now U.S. Pat. No. 4,653,350, which application is assigned to the assignee of the present invention, and incorporated herein by reference.

When the upshift is made in response to a detected step-out condition, however, the pressure command for the on-coming clutching device at the end of the fill phase drops immediately to near zero, and then progressively increases over the predetermined time interval $t_f$ to the final value $P_f$, as shown by the solid trace in Graph D of FIG. 2.

The pressure command for the off-going clutching device is reduced in step with the pressure command for the on-coming clutching device so that the release of the off-going clutching device occurs simultaneously with the apply of the on-coming clutching device. In this way, the speed ratio transition is softened, and the occurrence of a sharp torque reversal across the transmission gear elements due to the upshift is avoided. At time $t_4$, the off-going clutching device 30 is fully released, and the on-coming clutching device 32 is fully applied, completing the shift.

Figure 3:
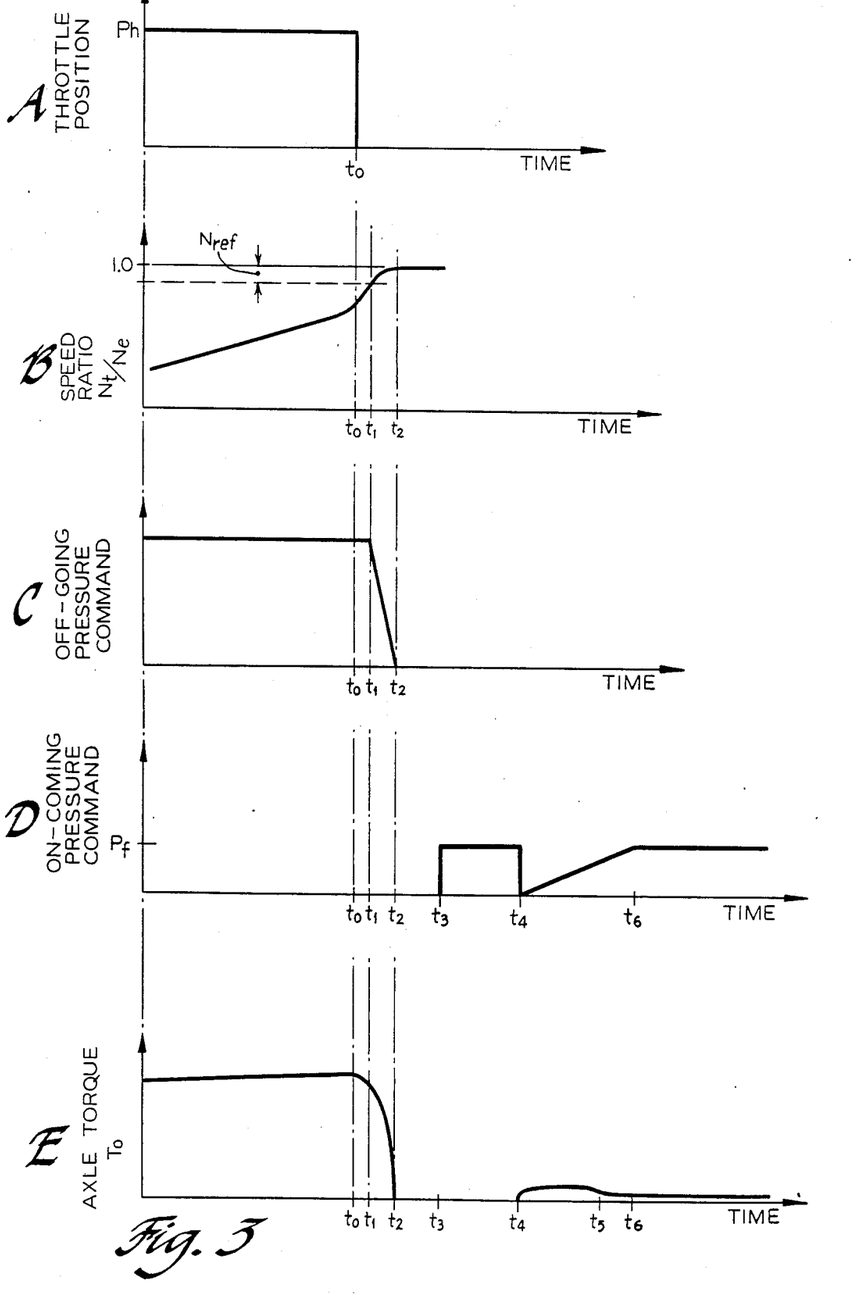
FIGS. 3A–E depict an upshift made in response to a upshift made in response to a severe step-out condition.

A relatively severe step-out condition is depicted in FIG. 3, where the Graphs A–E depict the same parameters as depicted in Graphs A–E of FIG. 2. Also, as in FIG. 2, the throttle release triggers a 2–3 upshift.

Prior to time $t_O$, the clutching device 30 is applied to engage the second speed ratio. The engine throttle is set at a relatively high torque position $P_h$, and the torque converter clutching device 26 is released. Accordingly, the engine attains a relatively high speed, and the speed ratio $N_t/N_e$ across the torque converter 24 increases with vehicle speed.

At time $t_O$, the operator of the vehicle fully releases the engine throttle, and the engine speed drops sharply.

Since the turbine speed $N_t$ does not change instantaneously, the ratio $N_t/N_e$ also rises sharply. Due to the low absolute throttle position, and the high rate change of throttle position, the control unit 270 determines that a relatively severe torque reversal is imminent. If an upshift is possible under such conditions, the active clutching device is released prior to the torque reversal and shift to avert the gear lash related driveline torque disturbance.

The proper moment for releasing the active clutching device 30 is identified by monitoring the speed ratio $N_t/N_e$ across the torque converter 24. When the ratio $N_t/N_e$ is less than 1:1, the engine is driving the vehicle and positive torque is being transmitted through torque converter 24. When the ratio $N_t/N_e$ is greater than 1:1, the vehicle is driving the engine and negative torque is being transmitted through the torque converter 24. When the ratio $N_t/N_e$ is exactly 1:1, no torque is being transmitted through the torque converter 24.

This characteristic relationship between the ratio $N_t/N_e$ and torque is used to control the release of the active clutching device by defining a window of ratios within which the release of the active clutching device will prevent the torque reversal from being transmitted to the driveline. The upper boundary of the window is defined by the ratio of 1:1, and the lower boundary of the window is defined by the reference ratio $N_{ref}$.

When the actual ratio $N_t/N_e$ enters the window as indicated at time $t_1$ in Graph B, the output torque $T_o$ is dropping rapidly, and the clutching device 30 is quickly released. Once the clutching device 30 is fully released at time $t_2$, the transmission 14 is effectively in neutral, and the output torque $T_o$ remains at zero. At such time, the turbine speed $N_t$ falls substantially to the engine speed $N_e$, and the ratio $N_t/N_e$ floats up to a value of unity (that is, 1:1).

At time $t_3$, a 2-3 upshift is commanded, and a shortened fill phase takes place between times $t_3$ and $t_4$ as described in reference to FIG. 2. Beginning at time $t_4$, the pressure commands for the on-coming and off-going torque establishing devices are scheduled as described in reference to FIG. 2 to progressively effect the upshift. As the on-coming clutching device 32 develops torque capacity, the output torque $T_o$ increases to a dynamic level as seen in Graph E, and then decreases at time $t_5$ to its lower, post-shift level. At time $t_6$, the off-going clutching device 30 is fully released, and the on-coming clutching device 32 is fully applied, completing the shift.

The timely release of the active clutching device (as in FIG. 3) prevents step-out input torque reversals from being applied across the transmission gear elements. The characteristic initial driveline torque disturbance due to gear element lash prior to the impending upshift is thereby avoided. The modification of the impending upshift parameters (as in FIGS. 2 and 3) softens the speed ratio transition effected by the impending upshift and avoids a lash related driveline torque disturbance due to the upshift. Taken together, the two measures operate to provide a high quality step-out upshift without the use of one-way torque transmitting elements.

In FIGS. 2 and 3, it is assumed that the torque converter clutching device is released at the time of the step-out. This is a reasonable assumption, especially in severe cases, because torque converter clutches are typically released in heavy throttle conditions to permit higher engine speeds and multiplication of torque through the torque converter. Nevertheless, the torque converter clutching device may be applied at the time of the step-out, and the control system of this invention includes a provision for releasing it as soon as a step-out is detected, even if the step-out is not severe enough to warrant a release of the active clutching device. If the torque converter clutching device is applied when a step-out is detected, the drivetrain is significantly stiffer, and the active clutching device is released immediately to avoid the transmission of a torque reversal, and minimize the torque required to complete the impending upshift.

Figure 4:
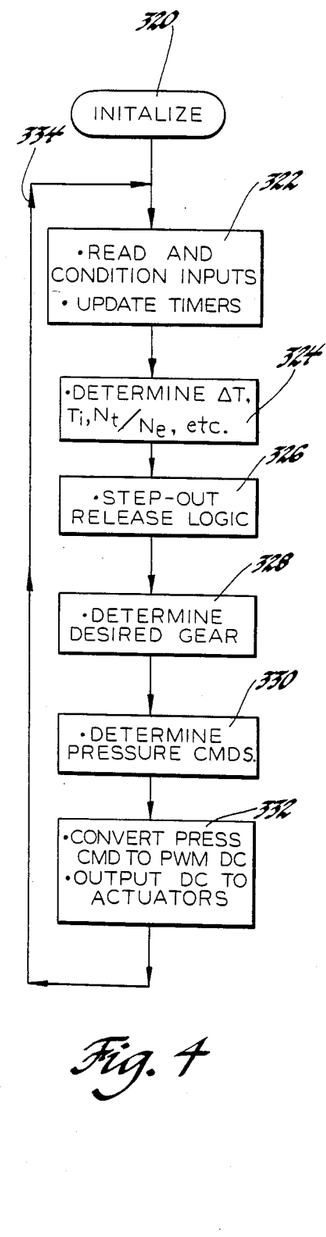
FIGS. 4–7 are flow diagrams representative of program instructions executed by the computer based control system of FIG. 1 for carrying out the control functions of this invention.
Figure 5:
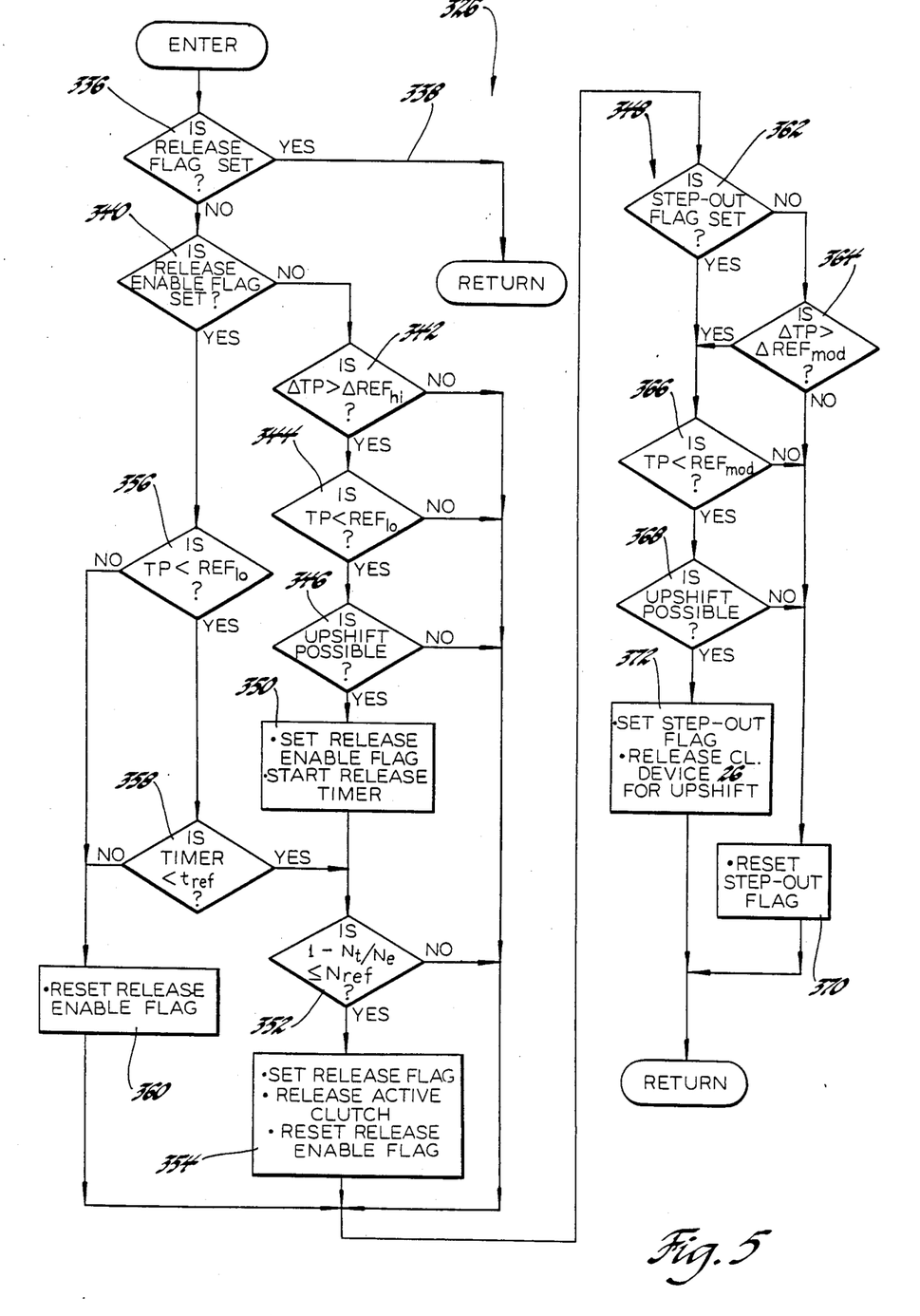
Figure 6:
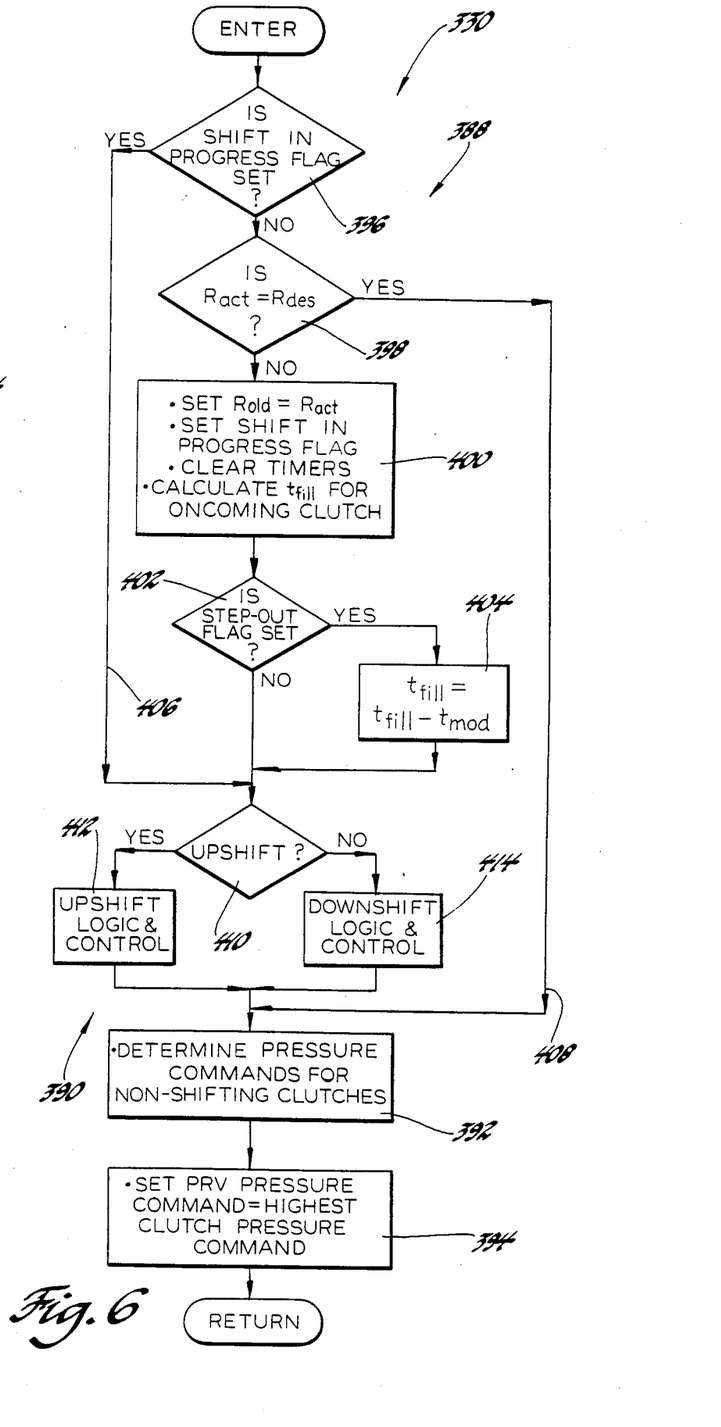
Figure 7:
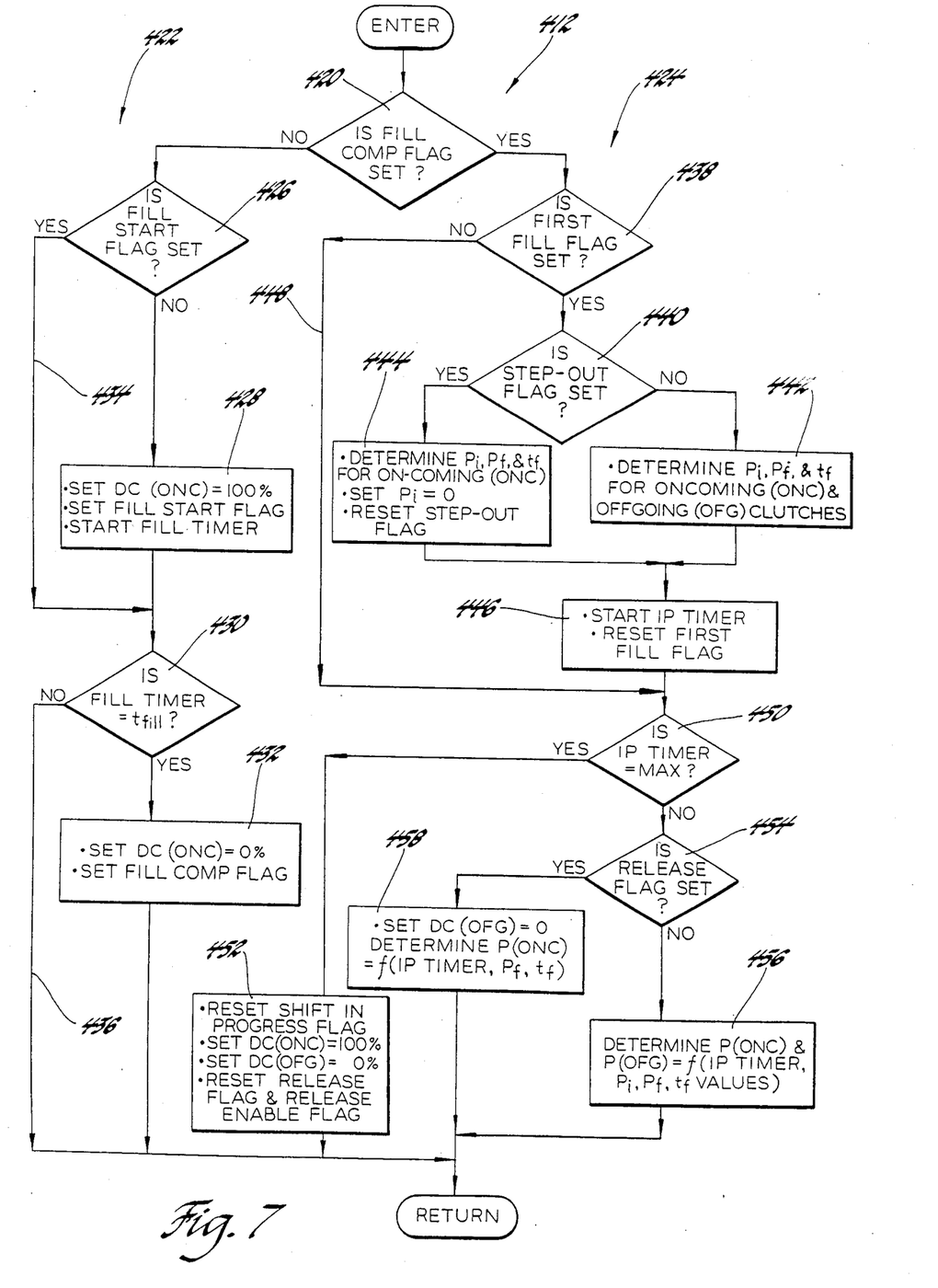

The flow diagrams depicted in FIGS. 4-7 represent program instructions to be executed by the microcomputer 302 of control unit 270 in mechanizing ratio shifting control functions of this invention. The flow diagram of FIG. 4 represents a main or executive program which calls various subroutines for executing particular control functions as necessary. The flow diagrams of FIGS. 5-7 represent the functions performed by those subroutines which are most pertinent to the present invention.

Referring now more particularly to FIG. 4, the reference numeral 320 designates a set of program instructions executed at the initiation of each period of vehicle operation for initializing the various registers, timers, etc. used in carrying out the control functions of this invention. Following such initialization, the instruction blocks 322-332 are repeatedly executed in sequence as designated by the flow diagram lines connecting such instruction blocks and the return line 334.

Instruction block 322 reads and conditions the various input signals applied to I/O device 300 via the lines 272-284, and updates (increments) the various control unit timers. Instruction block 324 calculates various terms used in the control algorithms, including the transmission input torque $T_i$, the speed ratio $N_t/N_e$, and the rate of change of throttle position $\Delta T$. Instruction block 326 performs the step-out release logic to determine if a release of the active clutch and/or a modification of the shift parameters is required. An expanded description of the instruction block 326 is given below in reference to the flow diagram of FIG. 5.

Instruction block 328 determines the desired speed ratio, $R_{des}$, in accordance with a number of inputs including throttle position, vehicle speed, and manual valve position. In transmission control, this function is generally referred to as shift pattern generation. Instruction block 330 determines the clutching device pressure commands for effecting a ratio shift, if required.

The pressure commands for the pressure regulator valve PRV and nonshifting clutching devices are also determined. An expanded description of the instruction block 330 is set forth below in reference to the flow diagrams of FIGS. 6-7. Instruction block 332 converts the clutching device and PRV pressure commands to a PWM duty cycle based on the operating characteristics of the various actuators (empirically determined), and energizes the actuator coils accordingly.

As indicated above, the flow diagram of FIG. 5 sets forth the step-out release logic generally referred to at the main loop instruction block 326 of FIG. 4. A number of flags are used to indicate the status of the engine 12 and transmission 14. The "RELEASE ENABLE" flag is used to indicate whether a step-out of sufficient magnitude to warrant release of the active clutching device has been detected. The "STEP-OUT" flag is used to indicate whether a step-out of sufficient magnitude to warrant modification of the shift parameters has been detected. The "RELEASE" flag indicates that the active clutching device has already been commanded to the released condition. Typically, the flags are reset, or cleared, to indicate the absence of the designated condition and set to indicate the presence of the designated condition. Initially, of course, each of the above flags are reset by the initialization instructions designated by the reference numeral 320 in FIG. 4.

The step-out release logic is initiated by determining at decision block 336 if the "RELEASE" flag is set. If so, the active clutching device has already been released, and the remainder of the routine is skipped as indicated by the flow diagram line 338. If not, decision block 340 is executed to determine if the "RELEASE ENABLE" flag is set.

If it is determined at decision block 340 that the "RELEASE ENABLE" flag is not set, it has not yet been determined that a release of the active clutching device is warranted, and the decision blocks 342-346 are executed to test the relevant input conditions. The decision block 342 determines if the change in throttle position $\Delta TP$ is greater than a relatively high reference change $\Delta REF_{hi}$, such as 20%/msec. The decision block 344 determines if the absolute throttle position TP is less than a relatively low reference position $REF_{lo}$, such as 10%. The decision block 346 determines if, given the present throttle position and vehicle speed, an upshift is possible.

If any of the decision blocks 342-346 are answered in the negative, the throttle release (if any) is not severe enough to warrant a release of the active clutching device, and the flow diagram branch designated generally by the reference numeral 348 is executed to determine if a less severe step-out has occurred. If all of the decision blocks 342-346 are answered in the affirmative, the instruction block 350 is executed to set the "RELEASE ENABLE" flag and to start a RELEASE TIMER.

Once the release enable conditions have been met and the release flag set, the decision block 352 is executed to determine if the ratio $N_t/N_e$ across the torque converter 24 is within a ratio window defined in relation to a speed ratio of 1:1. Such window is graphically depicted in Graph B of FIG. 3. Algebraically, this condition is determined by comparing the expression $(1.0-N_t/N_e)$ to a reference, $N_{ref}$. Such expression is viewed as a measure of the torque being transmitted through the torque converter 24. If the ratio $N_t/N_e$ is within the window, the instruction block 354 is executed to set the "RELEASE" flag, to command the active clutching device to a released state, and to reset the "RELEASE ENABLE" flag. If the ratio $N_t/N_e$ is not within the window, the execution of instruction block 354 is skipped.

A provision is also made for canceling the release enable mode after the release conditions have already been detected if the throttle position is no longer lower than the reference $REF_{lo}$, or if the RELEASE TIMER exceeds a preset time reference, $t_{ref}$. Thus, if either of the decision blocks 356 or 358 are answered in the negative, the instruction block 360 is executed to reset the "RELEASE ENABLE" flag.

As indicated above, the flow diagram branch 348 detects the occurrence of a less severe step-out operation. The conditions which are tested to detect such condition are the same as described above in reference to severe step-out detection, except for the reference values. Once it is determined at decision block 362 that the "STEP-OUT" flag is not set, the decision blocks 364-368 are executed. The decision block 364 determines if the change in throttle position $\Delta tp$ is greater than a moderate reference change $\Delta REF_{mod}$, such as 5%/msec. The decision block 366 determines if the absolute throttle position TP is less than a moderate reference position $REF_{mod}$, such as 30%.

In practice, it has been found that the term $REF_{mod}$ should be scheduled as a function of engine speed $N_e$ so that at relatively high engine speeds, a step-out condition will be detected even though the engine throttle position is not reduced to less than 10%. In other words, the detection of a step-out condition is more sensitive at a relatively high engine speed than at a relatively low engine speed. This effect is achieved by increasing the reference $REF_{mod}$ increases with increasing engine speed $N_e$. Preferably, the increase in $REF_{mod}$ for a given engine speed is scheduled in relation to the running friction of the engine at that speed. The decision block 368 determines if, given the present throttle position and vehicle speed, an upshift is possible.

If any of the decision blocks 364-368 are answered in the negative, the step-out (if any) is not severe enough to warrant an adjustment of the shift parameters and the instruction block 370 is executed to reset the "STEP-OUT" flag. If the decision blocks 364-368 are all answered in the affirmative, a significant step-out condition is indicated, and the instruction block 372 is executed to set the "STEP-OUT" flag, and to command the torque converter clutching device 26 to a released state in anticipation of the impending upshift.

In view of the above, it will be understood that in step-out situations for which the attendant torque reversal, if any, is expected to be relatively minor, the "STEP-OUT" flag is set. In more severe step-out situations for which the attendant torque reversal is expected to be sharp and result in an undesirable driveline torque disturbance, both the "STEP-OUT" flag and the "RELEASE" flag are set. However, the flow diagram of FIG. 5 also provides that neither the "STEP-OUT" flag nor the "RELEASE" flag is set—that is, no action is taken—if it is determined that an upshift is not possible.

Strictly speaking, this condition is not essential to the invention, and driveline torque disturbances can also be avoided when an upshift is not possible by releasing the active torque establishing device as described above. The condition is thus optional; it is included in the preferred embodiment set forth herein because we have determined that releasing and subsequently applying the same torque establishing device is not necessarily desirable in terms of driveability.

The flow diagrams of FIGS. 6-7 set forth the clutch and PRV pressure determination algorithm generally referred to at the main loop instruction block 330 of FIG. 4. As will be explained below, the flow diagram of FIG. 7 is actually a subset of the flow diagram of FIG. 6.

On entering the flow diagram of FIG. 6, the blocks designated generally by the reference numeral 388 are executed to set up initial conditions if a shift is in order. If a shift is in order, the blocks designated generally by the reference numeral 390 are executed to develop pressure commands for the clutching devices involved in the shift. Thereafter, the instruction blocks 392 and 394 are executed to develop pressure commands for the nonshifting clutches and the pressure regulator valve PRV, completing the routine. As indicated at instruction block 394, the pressure command for the regulator valve PRV is set equal to the highest of the pressure commands for the various clutching devices.

The blocks designated by the reference numeral 388 include the decision block 396 for determining if a shift is in progress as indicated by the "SHIFT IN PROGRESS" flag; the decision block 398 for determining if the actual speed ratio $R_{act}$ (that is, $N_o/N_i$) is equal to the desired speed ratio $R_{des}$ determined at instruction block 328 of FIG. 4; and the blocks 400–404 for setting up the initial conditions for a ratio shift.

The blocks 400–404 are only executed when decision blocks 396 and 398 are both answered in the negative. In such case, instruction block 400 serves to set the old ratio variable, $R_{old}$, equal to $R_{act}$, to set the "SHIFT IN PROGRESS" flag, clear the shift timers, and to calculate the fill time $t_{fill}$ for the on-coming clutching device. The decision block 402 is then executed to determine if the "STEP-OUT" flag is set. If so, instruction block 404 is executed to decrease the shift parameter relating to the fill time, $t_{fill}$, by a predetermined amount, $t_{mod}$. If the "STEP-OUT" flag is not set, the fill time $t_{fill}$ determined at instruction block 400 remains intact.

If a shift is in progress, the execution of blocks 398–404 is skipped, as indicated by the flow diagram line 406. If no shift is in progress, and decision block 398 is answered in the affirmative, the execution of the blocks 400–404 and the blocks designated by the reference numeral 390 is skipped, as indicated by the flow diagram line 408.

The blocks designated by the reference numeral 390 include the decision block 410 for determining if the shift is an upshift or a downshift; the instruction block 412 for developing pressure commands for the on-coming and off-going clutching devices if the shift is an upshift; and the instruction block 414 for developing the pressure commands for the on-coming and off-going clutching devices if the shift is a downshift.

The flow diagram of FIG. 7 expands on the instruction block 412—upshift logic and control. On entering the flow diagram of FIG. 7, the decision block 420 is first executed to determine if fill phase of the shift is completed, as indicated by the "FILL COMP" flag. If not, the flow diagram branch generally designated by the reference numeral 422 is executed; if so, the flow diagram branch generally designated by the reference numeral 424 is executed.

The flow diagram branch 422 includes a fill initializing routine comprising the blocks 426 and 428, and a fill completion routine comprising the blocks 430 and 432. At the beginning of each shift, the "FILL COMP" flag is not set, and the decision block 426 of the fill initializing routine is executed to determine if the fill phase has started, as indicated by the "FILL START" flag.

Initially, the "FILL START" flag is not set, and instruction block 428 is executed to set the energization duty cycle of the oncoming clutching device, DC(ONC), equal to 100%, to set the "FILL START" flag, and to start the FILL TIMER. Thereafter, decision block 426 is answered in the affirmative, and execution of instruction block 428 is skipped, as indicated by the flow diagram line 434. Decision block 430 of the fill completion routine determines if the count in FILL TIMER is greater than or equal to the fill time $t_{fill}$ determined at instruction block 400 of FIG. 6. If so, instruction block 432 is executed to set DC(ONC) equal to 0% and to set the "FILL COMP" flag. If decision block 430 is answered in the negative, the fill phase is incomplete, and execution of the instruction block 432 is skipped, as indicated by the flow diagram line 436.

The flow diagram branch 424 includes a shift initializing routine comprising the blocks 438–446, and a shift completion routine comprising the blocks 450–458. Decision block 438 of the initializing routine determines if the "FILL COMP" flag has just been set, as indicated by the status of the "FIRST FILL" flag. If so, the blocks 440–446 are executed to set up the torque and inertia phases of the shift. Decision block 440 determines if the "STEP-OUT" flag is set. If not, the instruction block 442 is executed to determine the pressure parameters $P_i$, $P_f$, and $t_f$ for the on-coming (ONC) and off-going (OFG) clutching devices according to a predetermined and torque dependent pressure schedule.

If the "STEP-OUT" flag is set, the instruction block 444 is executed to determine a modified pressure schedule as described in reference to graphs D of FIGS. 2 and 3 and to reset the "STEP-OUT" flag. Then, instruction block 446 starts the inertia phase timer, IP TIMER, and resets the "FIRST FILL" flag. Thereafter, the decision block 438 is answered in the negative, and further execution of the blocks 438–446 is skipped as indicated by the flow diagram line 448.

In the inertia phase completion routine, the decision block 450 is executed to determine if the count in IP TIMER is at a maximum value, MAX. If so, the shift is complete and instruction block 452 is executed to reset the "SHIFT IN PROGRESS" flag, to set the on-coming duty cycle DC(ONC) equal to 100%, to set the off-going duty cycle, DC(OFG), equal to 0%, and to reset the "RELEASE" and "RELEASE ENABLE" flags. If decision block 450 is answered in the negative, the decision block 454 is executed to determine if the "RELEASE" flag is set. If not, the instruction block 456 is executed to determine the on-coming and off-going pressure commands, P(ONC) and P(OFG), in the normal manner as a function of the $P_i$, $P_f$, $t_f$, and IP TIMER values.

If the "RELEASE" flag is set, the instruction block 458 is executed to set the off-going duty cycle DC(OFG) equal to zero, and to determine the on-coming pressure command P(ONC) as a function of the $P_f$, $t_f$, and IP TIMER values to obtain the result described above in reference to graphs D of FIGS. 2 and 3.

In the manner described above, the activation and deactivation of the torque establishing devices serves to minimize or prevent driveline torque disturbances in step-out situations. The characteristic driveline torque disturbance due to gear lash prior to the impending upshift is avoided in severe step-out situations by deactivating the active (off-going) torque establishing device and the characteristic driveline torque disturbance associated with the normal activation of the on-coming torque establishing device is minimized by adjusting the predetermined shift parameters in both minor and severe step-out situations. As a result, the objective of achieving a high quality step-out upshift without the use of one-way torque transmitting elements is achieved.

While this invention has been described in reference to the illustrated embodiment, it will be recognized that various modifications thereto will occur to those skilled in the art, and that step-out upshift control systems incorporating such modifications may fall within the scope of this invention which is defined by the appended claims.

The embodiments of the invention in which an exclusive property or privilege is claimed are defined as follows:

1. In a motor vehicle having an engine for producing output torque in accordance with operator demand, an automatic transmission having upper and lower speed ratio mechanisms for effecting predefined upper and lower speed ratios between input and output shafts thereof and a fluid operated torque establishing device associated with each of said upper and lower speed ratio mechanisms, each such torque establishing device being effective when activated to establish a bidirectional path of torque transmission between the transmission input and output shafts via the associated speed ratio mechanism, a fluid coupling for transmitting the engine output torque to the input shaft of the transmission, and a shift controller for selecting a desired speed ratio in accordance with the operator demand and selectively activating and deactivating the torque establishing devices so as to effect the desired speed ratio, a method of operation which prevents driveline torque disturbances due to lash in the speed ratio mechanisms when a reduction in the operator demand causes the torque carried by the transmission input shaft to reverse polarity, said method comprising the steps of:

monitoring the operator demand and detecting the occurrence of a specified operating condition which is likely to result in a relatively sharp reversal in the polarity of torque applied to the transmission input shaft through the fluid coupling;

determining a measure of the torque transmitted through said fluid coupling in relation to the relative speeds of the engine and transmission input shaft following the detection of said specified operating condition; and deactivating any activated torque establishing device when said measure of torque becomes less than a reference amount, so that when the reversal in applied torque occurs, the torque establishing devices are ineffective to transmit such torque to the vehicle driveline.

2. The method set forth in claim 1, wherein the measure of torque transmitted through the fluid coupling is determined in relation to the ratio of engine speed to transmission input shaft speed.

3. The method set forth in claim 1, wherein the engine has a throttle which is adjusted in accordance with operator demand, and the operator demand is monitored by sensing the throttle position.

4. The method set forth in claim 3, wherein the specified operating condition is detected when the sensed throttle position is below a reference throttle position and the rate of change in sensed throttle position is greater than a reference throttle position rate.

5. The method set forth in claim 4, including the step of:

inhibiting the deactivation of an activated torque establishing device if the sensed throttle position increases above the reference throttle position after the specified operating condition has been detected.

6. The method set forth in claim 1, including the step of:

inhibiting the deactivation of an activated torque establishing device if the measure of torque transmitted through the fluid coupling fails to become less than the reference amount within a predetermined time after the specified operating condition has been detected.

7. The method set forth in claim 1, including the step of:

inhibiting the deactivation of an activated torque establishing device if the detected operating conditions will not cause the shift controller to effect an upshift from the lower speed ratio to the upper speed ratio.

8. In a motor vehicle having an engine for producing output torque in accordance with operator demand, an automatic transmission having upper and lower speed ratio mechanisms for effecting predefined upper and lower speed ratios between input and output shafts thereof, and a fluid operated torque establishing device associated with each of said upper and lower speed ratio mechanisms, each such torque establishing device being effective when activated to establish a bi-directional path of torque transmission between the transmission input and output shafts via the associated speed ratio mechanism, a fluid coupling for transmitting the engine output torque to the input shaft of the transmission, and a shift controller for selecting a desired speed ratio in accordance with operator demand and selectively activating and deactivating the torque establishing devices in accordance with predetermined shift parameters so as to effect the desired speed ratio, a method of operation which prevents driveline torque disturbances due to lash in the speed ratio mechanisms when a reduction in the operator demand causes the torque carried by the transmission input shaft to reverse polarity, said method comprising the steps of:

monitoring the operator demand to identify the occurrence of a first set of operating conditions likely to result in a relatively minor reversal in the polarity of torque applied to the transmission input shaft and a second set of operating conditions likely to result in a relatively sharp reversal of the polarity of torque applied to the transmission input shaft;

in response to the identification of the first or second sets of operating conditions, adjusting the predetermined shift parameters of the shift controller so as to soften the activation of the torque establishing device associated with the upper speed ratio mechanism in the impending upshift; and in response to the identification of the second set of operating conditions, additionally determining a measure of the torque transmitted through the fluid coupling in relation to the relative speeds of the engine and transmission input shaft and deactivating any activated torque establishing device when such measure becomes less than a reference amount corresponding to a relatively low input torque level.

9. The method set forth in claim 8, wherein the engine has a throttle which is adjusted in accordance with operator demand, the identification of the first set of operating conditions involves a comparison of the actual throttle position and the actual rate of change in throttle position with a first reference position indicative of a moderate throttle setting and a first reference rate of change indicative of a moderate rate of change in throttle setting, and the identification of the second set of operating conditions involves a comparison of the actual throttle position and actual rate of change in throttle position with a second reference throttle position indicative of a relatively low throttle setting and a second reference rate of change indicative of a relatively fast rate of change in throttle position.

10. The method set forth in claim 9, wherein the adjustment of the predetermined shift parameters is inhibited if the actual throttle position increases above the first reference position after the occurrence of the first set of operating conditions has been identified, and the deactivation of activated torque establishing devices is inhibited if the actual throttle increases above the second reference position after the occurrence of the second set of operating conditions has been identified.

11. The method set forth in claim 8, wherein the first reference position is determined in direct relation to the engine speed so that detection of the first set of operating conditions is more sensitive at a relatively high engine speed than at a relatively low engine speed.

12. The method as set forth in claim 8, wherein the predetermined shift parameters of said shift controller include a predetermined fill time during which the torque establishing device associated with the upper speed ratio mechanism is filled in preparation for activation, and said adjustment of the predetermined shift parameters comprises the step of shortening the predetermined fill time for the impending upshift to the upper speed ratio.

* * * * *